United States Patent [19]

Bostwick

[11] 3,727,728

[45] Apr. 17, 1973

[54] AUTOMATIC BRAKE SLACK ADJUSTOR

[76] Inventor: James L. Bostwick, 1501 Bluff Drive, Santa Barbara, Calif. 93105

[22] Filed: Feb. 16, 1972

[21] Appl. No.: 226,695

[52] U.S. Cl..........................188/79.5 K, 188/196 BA
[51] Int. Cl...............................................F16d 65/56
[58] Field of Search....................188/79.5 K, 196 BA

[56] References Cited

UNITED STATES PATENTS

| | | |
|---|---|---|
| 3,121,478 | 2/1964 | Bostwick..........................188/79.5 K |
| 3,482,663 | 12/1969 | McGregor et al............188/79.5 K X |
| 3,526,303 | 9/1970 | Lodjic et al..................188/79.5 K X |
| 3,618,715 | 11/1971 | Bostwick..........................188/79.5 K |

*Primary Examiner*—Duane A. Reger
*Attorney*—Paul A. Weilein

[57] ABSTRACT

An operating rod is pivotally connected to a brake operating arm that rotates a conventional brakes-applying cam and the end of the operating rod extends beyond the pivotal connection to the brake operating arm. Slack adjustor mechanism in a housing on the brake operating arm includes a reciprocative member in a side compartment of the housing which member operates a pawl and ratchet means to take up slack in the brake. The side compartment is on the side of the housing that is away from the axle housing of the vehicle. The reciprocative member is connected to the extended end of the operating rod by a flexible tension member and is biased away from the extended end of the operating rod. Lost motion between the reciprocative member and the extended end of the operating rod determines the magnitude of the movement of the reciprocative member and thus determines the magnitude of the increments of slack adjustment.

8 Claims, 10 Drawing Figures

PATENTED APR 17 1973 3,727,728

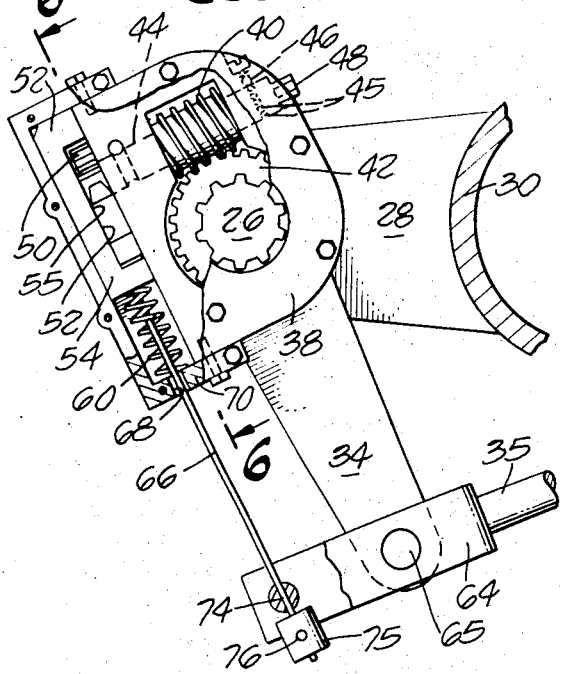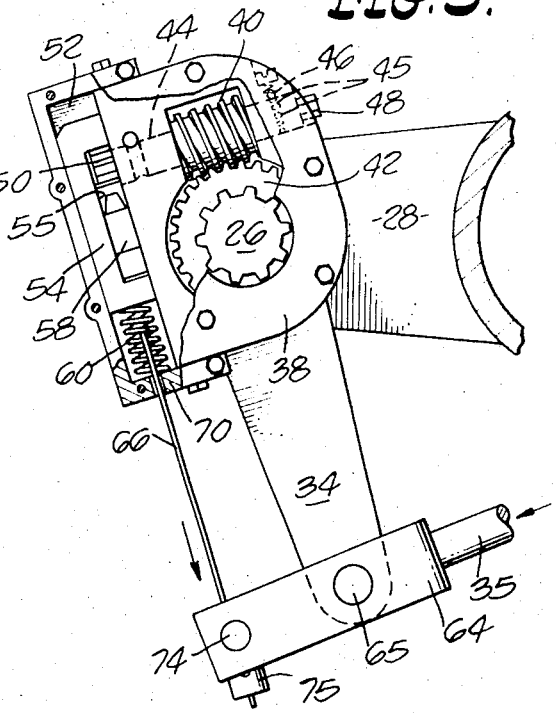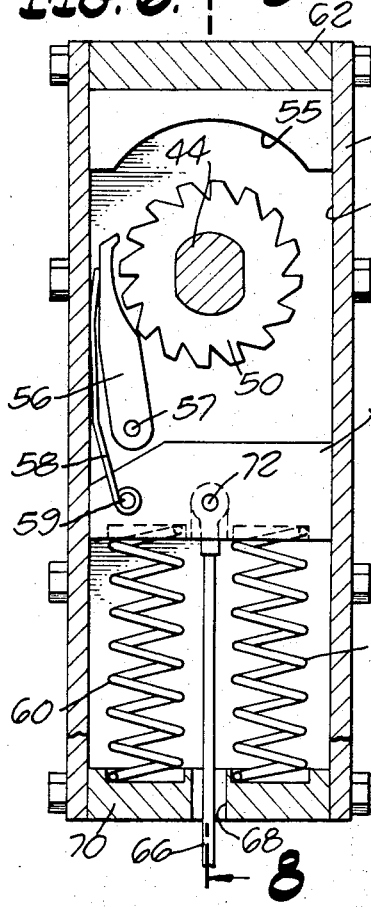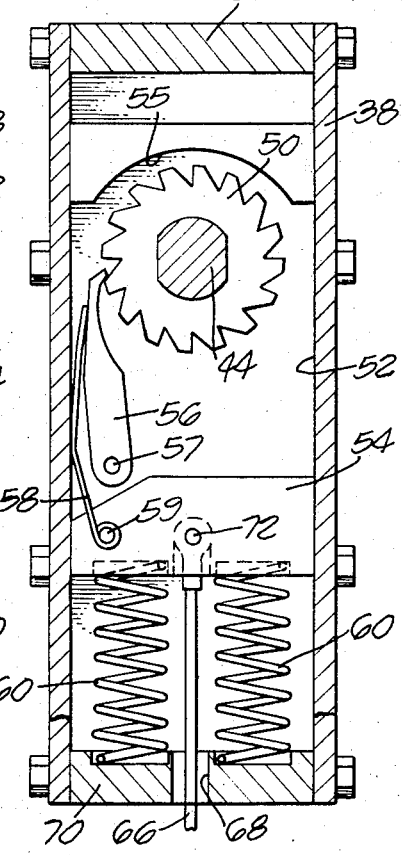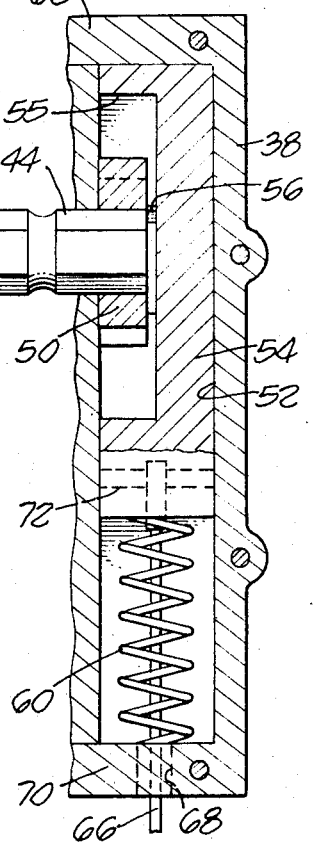

AUTOMATIC BRAKE SLACK ADJUSTOR

BACKGROUND OF THE INVENTION

In a brake system of the type to which the invention relates, an operating rod pushes on a brake operating arm which rotates a cam to spread a pair of brake shoes. A slack adjustor mechanism in a slack adjustor housing on the brake operating arm functions periodically to take up slack in compensation for wear on the brake shoes. The slack adjustor mechanism includes a reciprocative slide member in a side compartment of the brake adjustor housing, which slide member is biased towards a limit position and operates a pawl and ratchet means to adjust the normal rotary position of the brake-applying cam periodically by a small increment. The slide member reciprocates in response to swinging of the brake operating arm by the operating rod.

The shaft on which the brake-applying arm is mounted and which rotates the brake-applying cam in response to oscillation of the brake operating arm is at a given spacing from the axle housing of the vehicle, which spacing is determined by the diameter of the brake drum. If the axle housing is of square cross section as distinguished from round cross section, a corner of the axle housing may actually reduce the spacing. The slack adjustor mechanism necessarily extends into this spacing.

For two reasons it would be desirable to reduce the space required by the slack adjustor mechanism between the axle housing and the cam shaft. One reason is to avoid the necessity of crowding the slack adjustor towards the axle housing with consequent difficulty of access to the slack adjustor. The other reason is that if a vehicle wheel is of smaller than usual diameter with a correspondingly smaller brake drum, the spacing of the cam shaft from the axle housing is correspondingly reduced and a conventional slack adjustor cannot be accommodated to the reduced space.

SUMMARY OF THE INVENTION

An important object of the invention is to reduce the space requirement of a slack adjustor mechanism between the brake-applying cam shaft and the axle housing of a vehicle and thus either make the slack adjustor more accessible or make it possible for the slack adjustor to cooperate with a brake drum of a smaller diameter than would otherwise be possible.

Further objects of the invention include: to simplify the construction of a slack adjustor; to reduce the number of working parts; to avoid any tendency of the slack adjustor to hang up when it is operated by swinging movement of the brake operating arm; and to provide such a slack adjustor that may be substituted for a conventional slack adjustor in a simple and convenient manner with no change in the brake system.

Broadly described, the invention accomplishes these objects by making certain structural departures from conventional slack adjustors.

One departure relates to the operating rod that swings the brake operating arm. In a well known arrangement, the operating rod terminates at its pivotal connection with the brake operating arm and an intermediate point of the operating rod is connected to the reciprocative slide in the side compartment of the brake adjustor housing. Thus, the operating rod is fulcrummed on the brake operating arm and functions as a lever of the second class in its actuation of the reciprocative slide member. In the new arrangement the end of the operating rod extends beyond its pivotal connection to the brake operating arm and the extended end is operatively connected to the reciprocative slide member. Thus, in the new arrangement the operating rod functions as a lever of the first class instead of a lever of the second class in its actuation of the slide member.

A second structural change consists in connecting the operating rod to the slide member by means of a tension member such as a wire or cable instead of by means of a push rod. A stop or enlargement on the wire or cable engages the slide member and it is a simple matter to vary the effective length of the wire or cable by simply changing the position of the stop or enlargement thereon. In contrast, an adjustable push rod for operating the slide member must be made in two screw-threaded sections and some locking provision must be provided.

A third structural departure which is made possible by the first structural departure is in the location of the side compartment that encloses and guides the reciprocative slide member. The side compartment is relocated from the side of the slack adjustor housing that is towards the axle housing to the side that is away from the axle housing. Thus, the space that the slack adjustor housing must occupy between the brake-applying cam shaft and the axle housing of the vehicle is, in effect, reduced by the width dimension of the side housing. It is for this reason that the new slack adjustor can cooperate with a smaller brake drum than would otherwise be possible.

The various features and advantages of the invention may be understood from the following detailed description and the accompanying drawings.

BRIEF DESCRIPTION OF THE DRAWINGS

In the drawings which are to be regarded as merely illustrative:

FIG. 4 is an enlarged fragmentary side elevational view, partly in section, showing the angle of the operating rod relative to the brake operating arm when the brakes are released;

FIG. 5 is a view similar to FIG. 4 showing the angle of the operating rod relative to the brake operating arm when the brakes are applied;

FIG. 6 is an enlarged fragmentary section taken along the line 6—6 of FIG. 4 showing in side elevation the reciprocative slide member and associated components;

FIG. 7 is a view similar to FIG. 6 showing how the slide member is displaced by application of the brakes;

FIG. 8 is a fragmentary sectional view taken along the line 8—8 of FIG. 6;

DESCRIPTION OF THE PREFERRED EMBODIMENT OF THE INVENTION

Figure 1:
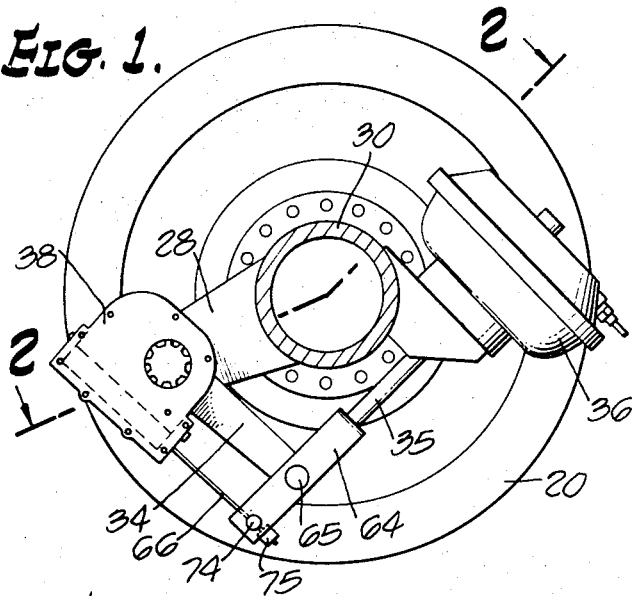
FIG. 1 is a side elevational view of a brake mechanism embodying the present invention.
Figure 3:
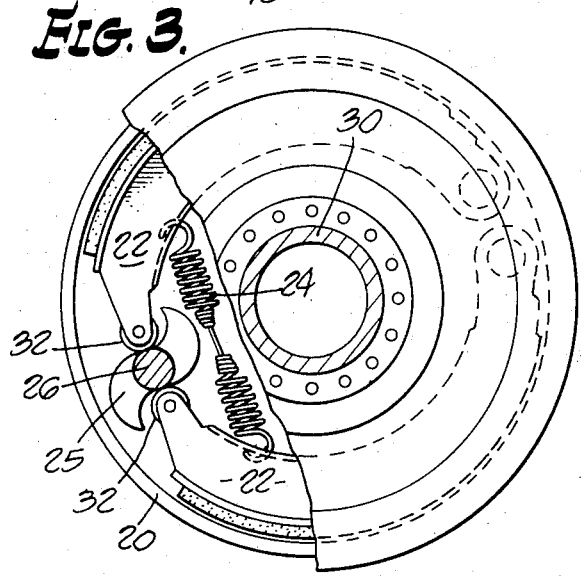
FIG. 3 is a cross sectional view taken along the line 3—3 of FIG. 2 with parts broken away and other parts shown in elevation.
Figure 2:
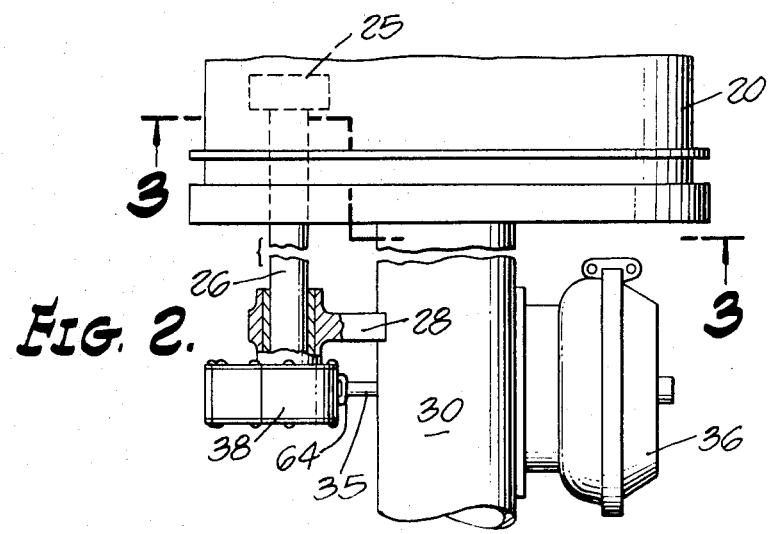
FIG. 2 is a sectional view along the angular line 2—2 of FIG. 1 showing in section and top plan the axle and brake assembly with which the invention cooperates.

FIGS. 1-3 show a conventional cam-actuated brake unit which includes a brake drum 20 with a pair of cooperating brake shoes 22 therein that are normally held in release positions by spring means 24. The brake shoes 22 are applied to the brake drum in a well known manner by means of a rotary cam 25 on a cam shaft 26 that is journalled in a bracket 28 that is carried by an axle housing 30. The cam 25 cooperates with a pair of anti-friction rollers 32 on the two brake shoes respectively.

Mounted on the cam shaft 26 in a well known adjustable manner is a brake operating arm 34 which controls the cam shaft and which in turn is controlled by an operating rod 35 that extends from a conventional fluid-pressure-actuated power cylinder 36.

The brake operating arm 34 is unitary with a slack adjustor housing 38 that is operatively connected to the cam shaft 26 by an automatic slack adjustor mechanism that is enclosed by the housing. As shown in FIGS. 4 and 5, the automatic slack adjustor mechanism includes the usual worm 40 in mesh with a worm gear 42 on the cam shaft 26. The worm 40 is on a slack adjustor shaft 44 that has a circumferential series of detent recesses 45 for cooperation selectively with a spring-pressed detent ball 46. The exterior end 48 of the slack adjustor shaft 44 is adapted for engagement by a suitable wrench or other tool for manual rotation of the worm 40 for corresponding angular adjustment of the brake operating arm 34 relative to the cam shaft 26.

The inner end of the slack adjustor shaft 44 carries a ratchet wheel 50 in a side compartment 52 of the slack adjustor housing 38. As taught by the prior art including my U.S. Pat. Nos. 3,121,478, 3,307,661 and 3,618,715, the ratchet wheel 42 is actuated intermittently by small increments by reciprocative means in the side compartment, the reciprocative means being spring-biased in one direction and being actuated in the other direction by swinging movement of the brake applying arm.

In this particular embodiment of the invention, the reciprocative member is a slide member 54 that is cut away on one face to provide a cavity 55 of sufficient dimension to clear the ratchet wheel 50 throughout the range of movement of the slide member. A push-type pawl 56 is mounted on the slide member 54 by a pivot 57 and is biased towards the ratchet wheel by a leaf spring 58 that is mounted on the slide member by a pin 59. A pair of coil springs 60 act in compression in the side compartment 52 to urge the slide member 54 towards a limit position shown in FIG. 6 at which limit position the slide member abuts an end wall 62 of the side compartment 52. It is to be noted that at this normal limit position of the slide member 54 the pawl 56 is disengaged from the ratchet wheel 50 so that the slack adjustor shaft 44 is free for manual adjustment whenever such manual adjustment is desired.

As best shown in FIGS. 4 and 5, the operating rod 35 is formed with a clevis 64 that is connected to the brake operating arm 34 by means of a pivot pin 65 and the end of the clevis extends a substantial distance beyond the pivot pin. This extended end of the operating rod 35 is operatively connected to the slide member 54 by a tension member 66 which may be a simple cable. In this instance, the tension member 66 is a flexible wire which extends through an aperture 68 in an end wall 70 of the side compartment 52 and is connected to the slide member 54 by means of a pin 72.

The wire 66 extends through a diametrical bore of a cross pin 74 that is free to rotate in the clevis 64 to accommodate minor changes in angle of the wire relative to the clevis. Beyond the cross pin 74, the wire 66 carries an enlargement or stop in the form of a collar 75 that is adjustably secured to the wire by a transverse set screw 76. When the operating rod 35 is moved from the brake releasing position shown in FIG. 4 to the brake applying position shown in FIG. 5, the operating rod is, in effect, rotated counterclockwise on the pivot pin 65 and thus pulls on the wire 66 to pull the slide member 54 from its normal limit position in opposition to the pair of coil springs 60. It is important to note that the wire 66 is freely slidable in the diametrical bore of the cross pin 74 and cannot bind in the bore to prevent complete release of the brakes with consequent possible brake fade-out.

Since the stop collar 75 abuts the cross pin 74 to pull on the slide member 54 when the brakes are applied, it is apparent that the effective length of the wire 66 is determined by the position to which the stop collar is adjusted on the end of the wire. The effective length of the wire 66 determined the magnitude of the increments of automatic slack adjustment. The selected effective length of the wire 66 is such that the stop collar 75 is spaced slightly from the cross pin 74, as shown in FIG. 4, when the brakes are released, and this spacing or normal gap between the stop collar 75 and the cross pin 74 results in a certain magnitude of lost motion in the connection of the clevis 64 with the slide member 54. The magnitude of this lost motion as fixed by the effective length of the wire 66, determines the magnitude of an increment of automatic slack adjustment and also, of course, determines the normal amount of clearance between the brake shoes 22 and the brake drum 20.

This fact may be readily understood when it is considered that the range of reciprocation of the slide member 54 is less than the circumferential extent of one tooth of the ratchet wheel. As the brake shoes wear the reciprocating pawl 56 progresses towards the sharp end of a tooth of the ratchet wheel and eventually engages the tooth to advance the ratchet wheel by one step. Thus, increasing the effective length of the wire 66 by adjustment of the stop collar 75 increases the normal clearance between the brake shoes and the brake drum and once the effective length of the wire has been set it is not necessary thereafter to change the effective length even when the brakes are relined and even if the brake drum is machined.

In the disclosure in my prior U.S. Pat. No. 3,307,661, a slide member in a side compartment of the slack adjustor housing is operatively connected to the operating rod but the operative connection is in the form of a rigid push rod instead of a tension member. The difference between the two arrangements may be understood by reference to the simplified FIGS. 9 and 10 in which FIG. 9 represents the prior art and FIG. 10 illustrates the present invention.

Figure 9:
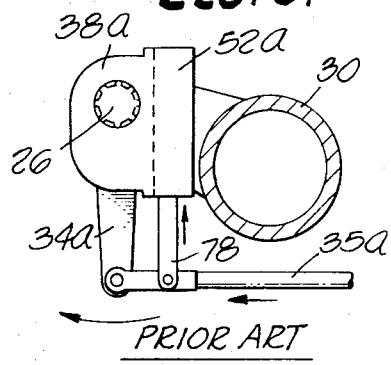
FIG. 9 is a simplified side elevational view illustrating the prior art.
Figure 10:
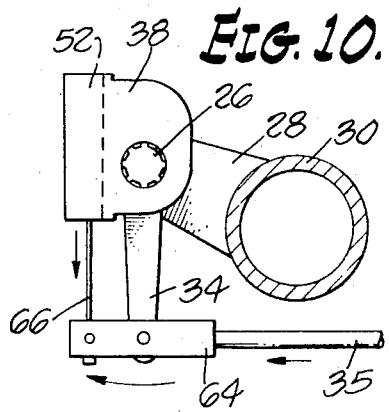
FIG. 10 is a similar view illustrating the structural changes and the new geometry taught by the present invention.

In FIG. 10 the side compartment 52 of the slack adjustor housing 38 is on the side of the slack adjustor housing that is away from the axle housing 30 and therefore the side compartment does not lessen the space for the slack adjustor housing that is available between the axle housing 30 and the cam shaft 26. In contrast, in FIG. 9 the side compartment 52a is on the side of the slack adjustor housing 38a that is towards the axle housing 30 to take up space between the axle housing and the cam shaft 26. It is apparent that a smaller brake drum could not be substituted in FIG. 9 because it would reduce the distance of the cam shaft 26 from the axle housing 30. On the other hand, it is apparent in FIG. 10 that a substantially smaller brake drum could be substituted because of the ample clearance between the slack adjustor housing 38 and the axle housing 30.

In a comparison of the prior arrangement shown in FIG. 9 with the new arrangement shown in FIG. 10, it is apparent that there are three changes which account for the increased clearance between the slack adjustor housing and the brake axle housing. The first change is the relocation of the side compartment 52 from the side of the slack adjustor housing that is nearest the axle housing to the side of the slack adjustor housing that is remote from the axle housing. In effect, the relocation of the side compartment is accomplished by rotating the slack adjustor housing 180°. The second change is the substitution of the tension member 66 in FIG. 10 for the push rod 78 in FIG. 9. The third change is the use of a push rod 35 which functions as a lever of the first class instead of the push rod 35a of FIG. 9 that functions as a lever of the second class.

In the lever of the second class shown in FIG. 9, one end of the operating rod 35a is fulcrummed on the end of the brake operating arm 34a and the load imposed by the spring-pressed slide member in the side compartment 52a is applied to an intermediate point of the operating rod. On the other hand, in the arrangement of a lever of the first class in FIG. 10, an intermediate point of the operating rod 35 is fulcrummed on the end of the brake operating arm 34 and the load that is imposed on the operating rod by the slide member in the side compartment 52 is applied to the extended end of the operating rod.

My description in specific detail of the presently preferred embodiment of the invention will suggest various changes, substitutions, and other departures from my disclosure within the spirit and scope of the appended claims.

I claim:

1. In a brake system having a brake arm controlling a rotary brake-applying cam with an operating rod pivotally connected to the brake arm and wherein a housing carried by the brake arm contains automatic slack adjustor mechanism and a side compartment of the housing confines and guides a reciprocative member to operate the slack adjustor mechanism by pawl and ratchet means in response to the actuation of the brake arm by the operating rod,
   the improvement for structural simplicity, economy, and saving of space adjacent the axle of the vehicle, comprising:
   said side compartment being located on the side of the slack adjustor housing that is away from the axle instead of the side that is toward the axle;
   the operating rod extending beyond its pivotal connection to the brake arm with its far end in at least approximate alignment with the side compartment of the slack adjustor housing;
   the reciprocative member in the side compartment being biased away from said far end of the operating rod;
   and said far end of the operating rod being connected to the reciprocative member by a tension member so that the operating rod functions as a lever of the first class in actuating the reciprocative member.

2. An improvement as set forth in claim 1 in which a pair of coil springs act in compression in the side compartment to bias the reciprocative member and said tension member extends between the two springs.

3. An improvement as set forth in claim 1 in which the connection of the far end of the operating rod with the reciprocating rod by means of the tension member is a lost-motion connection with the magnitude of the lost motion determining the magnitude of reciprocation of the reciprocative member by the operating rod.

4. An improvement as set forth in claim 1 in which the tension member is a flexible member;
   in which the flexible member slidingly extends through the far end of the operating rod with the flexible member extending beyond the far end of the operating rod;
   and in which a stop on the end of the flexible member engages the far end of the operating rod to actuate the reciprocative member in response to application of the brakes.

5. A combination as set forth in claim 4 in which said stop is adjustable along the length of the flexible member for adjustment of the magnitude of reciprocation of the reciprocative member.

6. An improvement as set forth in claim 4 in which a rotary member is journalled in the far end of the operating rod for rotation relative to the operating rod on an axis extending transversely of the operating rod;
   and in which the flexible member slidingly extends through an aperture of the rotary member.

7. An improvement as set forth in claim 6 in which the far end of the operating member is in the form of a clevis and in which said rotary member is a cross pin journalled in the clevis.

8. An improvement as set forth in claim 7 in which said tension member is a flexible wire and in which the flexible wire extends through a diametrical bore of said cross pin.

* * * * *